United States Patent
Shatil et al.

(10) Patent No.: US 8,542,610 B2
(45) Date of Patent: Sep. 24, 2013

(54) ADAPTIVE POWER SAVING FOR A MOBILE SUBSCRIBER UNIT IN A WIRELESS COMMUNICATION NETWORK

(75) Inventors: Ohad Shatil, Kenosha, WI (US); Yungang Wang, Singapore (SG); Win NuNu Win, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 286 days.

(21) Appl. No.: 13/077,258

(22) Filed: Mar. 31, 2011

(65) Prior Publication Data
US 2012/0250537 A1 Oct. 4, 2012

(51) Int. Cl.
*G08C 15/00* (2006.01)
(52) U.S. Cl.
USPC ............ 370/252; 370/253; 709/248; 455/574
(58) Field of Classification Search
USPC ....................................................... 370/252
See application file for complete search history.

(56) References Cited

U.S. PATENT DOCUMENTS

| | | | |
|---|---|---|---|
| 2005/0128988 A1* | 6/2005 | Simpson et al. | 370/338 |
| 2005/0221869 A1* | 10/2005 | Liu et al. | 455/574 |
| 2006/0182056 A1 | 8/2006 | Kim et al. | |
| 2007/0281757 A1* | 12/2007 | Iguchi et al. | 455/574 |
| 2008/0310485 A1* | 12/2008 | Soliman et al. | 375/147 |
| 2011/0096679 A1* | 4/2011 | Hayashino et al. | 370/252 |
| 2011/0153805 A1* | 6/2011 | Beninghaus et al. | 709/224 |
| 2012/0163349 A1* | 6/2012 | Fontaine et al. | 370/336 |
| 2013/0070715 A1* | 3/2013 | Nanda et al. | 370/329 |

OTHER PUBLICATIONS

International Search Report and Written Opinion for International Patent Application No. PCT/US2012/028679 mailed on May 23, 2012.

* cited by examiner

*Primary Examiner* — Charles C Jiang
*Assistant Examiner* — Deepa Belur
(74) *Attorney, Agent, or Firm* — Brian M. Mancini

(57) ABSTRACT

A method and apparatus for adaptive power saving for a mobile subscriber unit in a wireless communication network includes receiving beacons from an access point, measuring timing periods between received beacons, determining a delay in timing periods, and associating the delay in timing periods to a change in a quality of a communication link. The link quality can be quantified and used for reconfiguring power-save parameters in response to a change in link quality.

16 Claims, 4 Drawing Sheets

ADAPTIVE POWER SAVING FOR A MOBILE SUBSCRIBER UNIT IN A WIRELESS COMMUNICATION NETWORK

FIELD OF THE DISCLOSURE

The present invention relates generally to wireless communication networks and more particularly to adaptive power saving for a mobile device in a wireless communication network.

BACKGROUND

Wireless communication networks, such as wireless wide-area network or wireless local-area networks (WLAN) such as IEEE 802.11 wireless communication networks are able to provide communications for their mobile subscriber units (MSU) utilizing wireless access support through local access points (AP). One task that any MSU typically deals with is an ongoing evaluation of the radio frequency (RF) environment. The MSU, for example, can evaluate the RF environment with the AP for adjusting transmitter operations, or consider the information in its roaming, and scanning algorithms.

There are multiple methodologies in use for RF link evaluation. However, they all have one or more of the following conceptual deficiencies. Firstly, the local MSU antenna can physically perceive the RF environment at only discrete events of transmitting or receiving WLAN traffic. For example, signal strength indicators are provided as discrete power measures that can be subjected to the way the MSU is held and antenna-sensitivity at each moment, which would not always mean that the RF environment really changes. In another example, there can be some discrete points in time where a connection is lost due to local aspects and positioning of the MSU.

Secondly, a number of WLAN protocols facilitate information exchange between the MSU and APs with regards to RF status. For example, IEEE 802.11k can inform the MSU with Radio Resource Measurements data, which is compiled to reflect RF utilization, load, capacity, noise, interference, etc. This data is very helpful for an MSU's scanning and roaming decisions. However, producing this information requires active messaging between the MSU and AP, and is not under the control of the MSU. In addition, this active messaging is not trivial to synchronize, and could be interruptive when there is an active voice or video session over the WLAN link.

Another task that any MSU typically deals with is operating in a power saving mode wherein the transmitter, and optionally the receiver, is powered down during predetermined time periods. The power saving mode is intended to meet three major objectives: 1) conserve as much battery power as possible. That is, maintain a scheme that would turn the radio off when it is not used, as oppose to have the radio being continuously awake, 2) provide a stable wireless connection with the network as the MSU roams around, and 3) keeping the MSU receiver on when expecting to receive data from an AP.

Once an MSU completes negotiating a Power Save (PS) scheme applicable with the network, and establishes the successful connection, the MSU then configures its receiver to match predicted performance with the network protocol properties, after which the PS scheme remains static for the duration of the connection. However, this scheme has two problems. First the PS negotiated scheme does not provide information about the environmental Radio Frequency (RF) situation at the time of the connection, which may not fit the RF environment optimally. Second, even if matching could be better optimized at the time of the connection, environmental RF factors do change over time.

It is noted here that while some existing MSU implementations do apply dynamic adjustments per environmental changes to improve their performance, they do so by adjusting the transmitter only, and not the power save characteristics of the receiver. However, receivers have not been adjusted when subjected to RF issues, which has a large impact on the stability of the connection and the incoming traffic.

Accordingly, there is a need for a new technique to adapt a power saving mode for a receiver of a mobile subscriber unit in a wireless communication network in response to changing RF conditions.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
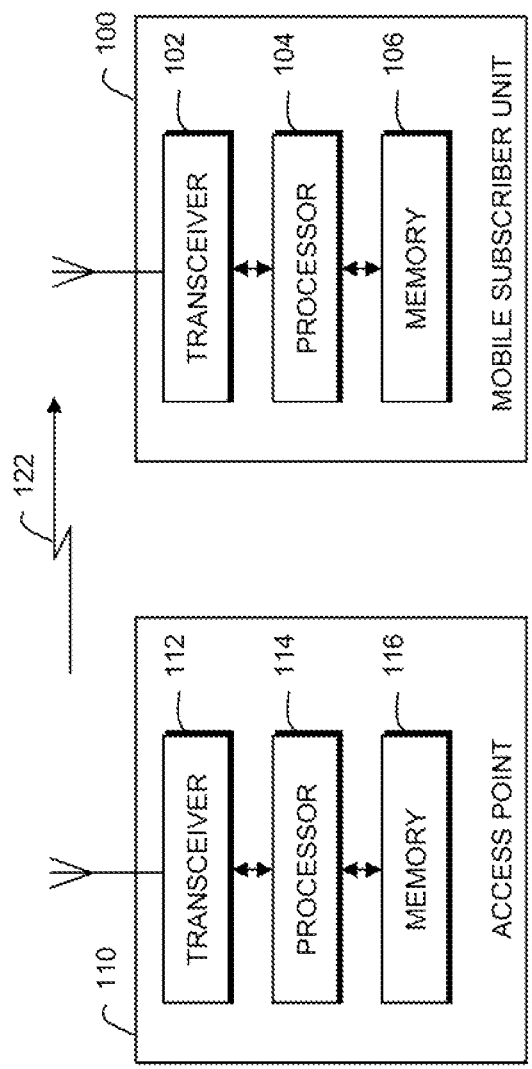
FIG. 1 is a simplified block diagram of a communication network, in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a novel technique to provide an adaptive power saving mode for a mobile subscriber unit receiver in a wireless communication network in response to changing radio frequency (RF) conditions. In particular, the present invention samples and relies on an access point's (AP) beacon timing information to determine RF link quality, and not on signal measurements or other receiver/transmitter statistics. The present invention operates in a dynamic manner and is passive, in that a mobile subscriber unit (MSU) can act on its power saving mode without any active exchange of RF information with the AP.

FIG. 1 is a block diagram depiction of one embodiment of the present invention utilizing a wireless local-area communication network, including IEEE 802.11 wireless communication systems, as the example described herein. However, it should be recognized that the present invention is also applicable to other wireless communication systems. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for such wireless telecommunications systems. The communication system represents a system operable in a network that may be based on different wireless protocols. For example, the description that follows can apply to a wireless wideband area network or other network, employing wireless technologies such as IEEE's 802.11, 802.16, or 802.20, modified to implement embodiments of the present invention.

Referring to FIG. 1, there is shown a block diagram of wireless communication network having at least one access point (AP) 110 and at least one mobile subscriber unit (MSU) 100 adapted to support the inventive concepts of the embodiments of the present invention. Those skilled in the art will recognize that FIG. 1 does not depict all of the network equipment necessary for system to operate but only those system components and logical entities particularly relevant to the description of the embodiments herein. For example, an access point, eNodeB, or base station can be connected with or comprise one or more devices such as wireless area network stations (which include access nodes (ANs), Media Access Controllers (MAC), AP controllers, and/or switches), base transceiver stations (BTSs), base site controllers (BSCs), packet control functions (PCFs), packet control units (PCUs), and/or radio network controllers (RNCs). However, none of these other devices are specifically shown in FIG. 1.

MSU 100 is depicted in FIG. 1 as comprising a processor 104 coupled to a transceiver 102 and memory 106. In general, components such as processors, memories, and transceivers are well-known. For example, the transceiver 102 is operable to communicate with user devices over an IEEE 802.11 interface. As used herein, the terms transceiver and receiver can be used interchangeably, and the terms transceiver and transmitter can be used interchangeably. In addition, processing units are known to comprise basic components such as, but not limited to, microprocessors, microcontrollers, memory cache, application-specific integrated circuits (ASICs), and/or logic circuitry. Such components are typically adapted to implement algorithms and/or protocols that have been expressed using high-level design languages or descriptions, expressed using computer instructions, expressed using messaging logic flow diagrams. Thus, given an algorithm, a logic flow, a messaging/signaling flow, and/or a protocol specification, those skilled in the art are aware of the many design and development techniques available to implement an MSU and AP processor that performs the given logic. MSUs can also comprise an antenna, a keypad, a speaker, a microphone, and a display, as are known in the art. Therefore, MSU 100 represents a known apparatus that has been adapted, in accordance with the description herein, to implement various embodiments of the present invention. MSUs or remote unit platforms are known to refer to a wide variety of consumer electronic platforms such as clients, mobile stations, mobile nodes, user equipment, user stations, subscriber equipment, subscriber stations, access terminals, remote terminals, terminal equipment, gaming devices, personal computers, and personal digital assistants, and the like, all referred to herein as MSU.

Similar to the MSU, AP 110 is depicted in FIG. 1 as comprising a processor 114 coupled to a transceiver 112 and memory 116. The AP 110 uses a local area wireless interface for communication with at least one MSU 100. The local area wireless interface can include a forward link and a reverse link used in communications between the MSU and the AP. APs and MSUs are known to comprise basic components such as, but not limited to, microprocessors, digital signal processors (DSPs), microcontrollers, memory devices, application-specific integrated circuits, and/or logic circuitry. Such devices are typically adapted to implement algorithms and/or protocols that have been expressed using high-level design languages or descriptions, expressed using computer instructions, expressed using messaging/signaling flow diagrams, and/or expressed using logic flow diagrams. Thus, given an algorithm, a logic flow, a messaging/signaling flow, a call flow, and/or a protocol specification, those skilled in the art are aware of the many design and development techniques available to implement user equipment that performs the given logic.

Referring back to FIG. 1, in a first embodiment, the present invention provides a novel technique for an MSU to passively classify RF link quality in a WLAN using beacon timing. The evaluation of RF link quality is based on the IEEE 802.11 beaconing performance of the network's APs. The IEEE 802.11 beacon 122 is the most significant property of the WLAN architecture. In terms of scheduling, beacons need to be served and aired in the highest priority possible with respect to timing accuracy. In addition, the IEEE 802.11 standard defines that a Time Synchronization Function (TSF) field inside the beacon will be assigned with a value that accurately reflects the Target Beaconing Transmission Time (TBTT). That accuracy level, per the 802.11 standard, is to be within a range of ±0.01% with respect to the relationship between the TBTT and the Beacon Interval for the AP. In practice, this TBTT accuracy level is not met by any 802.11 AP vendor due to hardware and antenna limitations. Therefore, there are several informal interoperability guidelines which set accuracy factors and respective expectations, which IEEE 802.11 AP and MSU vendors can refer to while designing their Power Save features. For example, an "excellent" accuracy level is typically considered when TBTT is falling within around twenty times the abovementioned standard ±0.01% range. In a configuration where Beacon Interval is 100 milliseconds this means delays are within a 0.2 millisecond window. In another example, a "good" accuracy level, i.e. one below "excellent", is typically considered when the TBTT is falling within about fifty times the standard ±0.01% range. In a configuration where Beacon Interval is 100 milliseconds this means delays are within 0.5 milliseconds window. And so on.

With the Medium Access Control (MAC) accuracy and priority that is required from an AP to handle beacon transmissions, changes of timing patterns and respective information inside the beacon reflect overall RF pattern changes, and can also assist in providing information on whether a change reflects a pure RF situation or system wide implementation behavior. Experimentation for the present invention has shown that the timing properties of the beacon 122 provide accurate correlation to RF link quality. For example, changes in scheduling and delivery of a next beacon, per the configured Beacon Interval (BI) and expected Target Beacon Transmission Time (TBTT), shows what kind of medium access challenges the AP is dealing with. The Time Synchronization Function (TSF) field in the beacon reflects the way the AP did calculations for the delivery of the beacon (per compliance with the 802.11 standard). A mathematical expression for detecting such AP scheduling impact, which best matches the IEEE 802.11 specifications, is: $TBTT_{current\ beacon} = MODULUS(number = TSF_{previous\ beacon}, divisor = BI_{previous\ beacon})$, where the expectation is that in a perfect world the MODULUS expression will yield zero. Other mathematical expressions can be used for such detection as well.

In accordance with the present invention, the TBTT is used by the MSU to check the timing properties of the beacon delivery, which is then associated with RF link quality, for example using a table in a memory 106 of the MSU. In particular, the present invention measures if there is a change in a timing of the receipt of a beacon that is different than an AP's previously announced TTBT in the TSF field. If the beacon was received at an unexpected time, then this can be indicative of a degraded RF environment, i.e. link quality. Typically, beacon timing is delayed within a degraded RF environment. However, IEEE 802.11 does allow for negative 0.01% with respect to the TBTT. Therefore, AP vendors could design for this if they wish, and add a reasonable small negative "drift" factor, into the TBTT calculation to advance beacon timing. The present invention accommodates both the advanced and delayed conditions. The present invention also covers a special case for AP vendors that do not comply with the IEEE 802.11 specification, wherein despite trying to schedule beacons at a relative-time, $t_0$, plus positive-drift, their TSF miss-calculation/miss-assignment would make it appear to the MSU as if a current beacon is delivered almost right next to a TBTT of a next-beacon, i.e. if an absolute timeline of beacons is examined, each TSF would virtually fall where a respective next-beacon suppose to fall. In this case, conceptually, the MSU could treat this as a very large "abnormal/systematic" delay with respect to a current TBTT, or otherwise as small or too-early "abnormal/systematic" advance with respect to a next-TBTT. Either case does not matter to the MSU as long as it can wake-up on time in constant pattern. Preferably, if a change in beacon timing is found the MSU can re-configure its beacon sampling technique, to match up the timing with the currently evaluated RF performance, i.e. to enhance the beacon sampling success rate.

In practice, the MSU receiver receives a beacon 122 according to whichever Power Save (PS) implementation the MSU is using, which determines when the radio needs to wake up to hear the next beacon. As TBTT timing to wake up is calculated for PS purposes, it is typical that the PS implementation applies additional time-before and time-after the TBTT, to make sure that the radio awake-time would account for any RF link quality or AP delays on top of the TBTT. The present invention improves on this technique to provide additional receiver power savings by adjusting a dwell time of a wake up window in response to changes in beacon timing. The present invention acts independent of the actual PS techniques that an MSU uses.

The present invention provides a dynamic Power Save (PS) technique, which matches the configuration of a MSU's receiver functionality to the ever changing RF conditions. By adapting the MSU configuration dynamically, properties such as battery conservation, visibility of the network, and listening times for incoming traffic are changed, and the receiver performance is better aligned with RF conditions as it interoperates with the WLAN network. The adaptation of the present invention aims to accommodate three main categories of RF dynamics.

First and most commonly, MSU adaptation is needed when the receiver performance suffers from over-the-air issues. That is, there can be external interference, jamming issues, collisions, congestion, utilization issues, and so on, which impact both the MSU and AP's in specific regions of the WLAN deployment. When these issues happen, they typically occur quickly, in a random manner, and their severity is unpredictable. Second and less commonly, when MSU adaptation is needed for deployments in which the balancing network coverage and/or utilization are not well planned, then the impact on receiver performance may be quite large and could affect the receiver for longer periods of time. Third and least commonly overall, is when MSU adaptation is needed irrespective of how well the WLAN network is planned, when the AP vendor equipment systematically underperforms with regards to its runtime 802.11 operation. In this case, the MSU will need to adapt and stay in a more "forgiving" configuration presumably as long as the systematic issue is present, irrespective of geographical areas.

Figure 2:
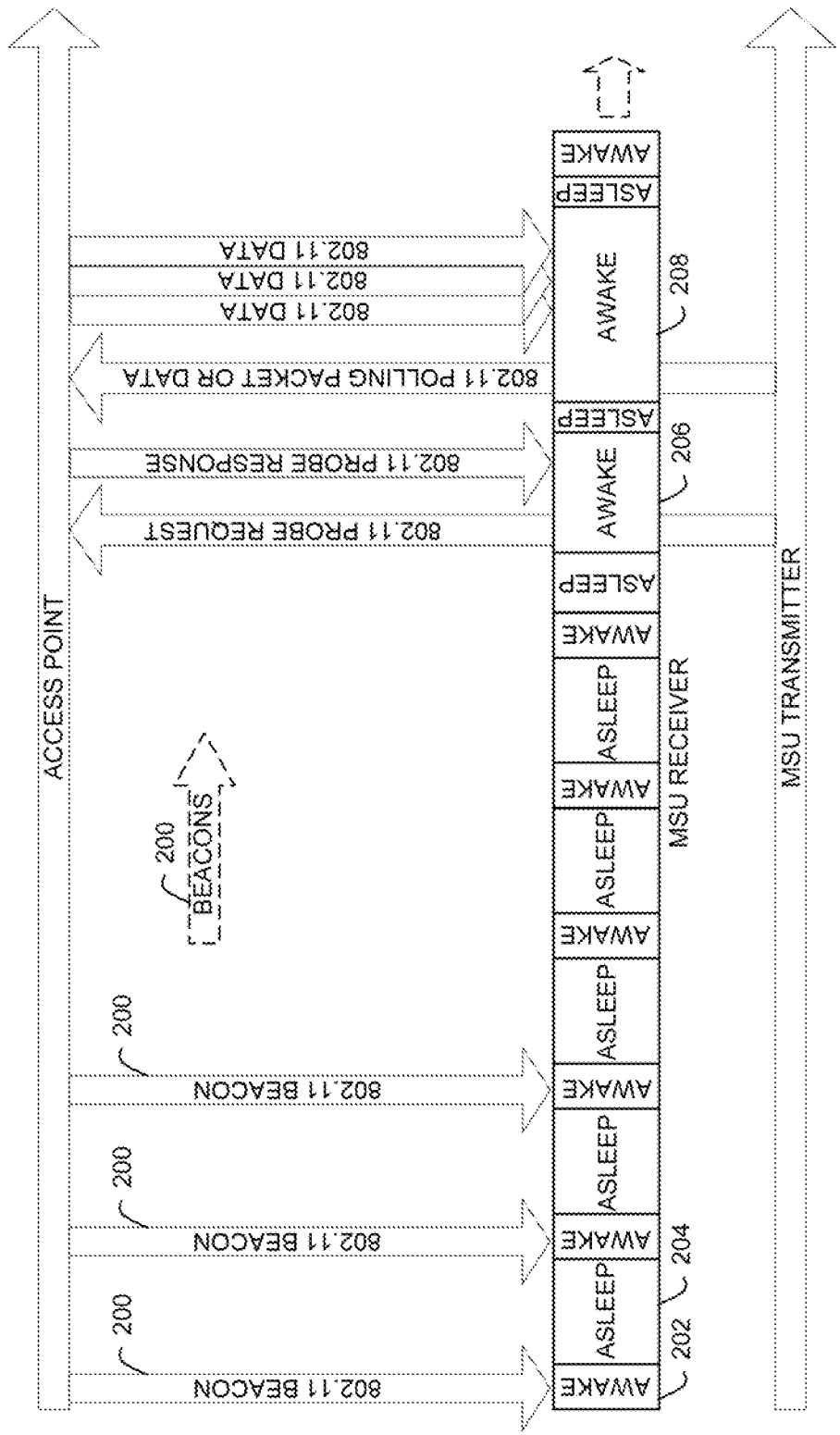
FIG. 2 is a simplified flow diagram of a communications in communication network, in accordance with the present invention.

FIG. 2 provides timeline of MSU/AP interaction in a WLAN, showing three major Power-Save (PS) scenarios for an MSU's receiver. The three scenarios are blended in the overall technique that aims to keep the receiver in a sleep state as much as possible to assist in power conservation. Firstly, the receiver has scheduled awake times 202 to receive every beacon, or every $N^{th}$ beacon to conserve processing overhead, where the receiver is scheduled to wake up to receive the currently serving Access Point (AP) beacons, and if applicable wake up to passively hear beacons of other neighboring AP's. These awake times 202 are referred to as the dwell-time settings for Passive-Scan (DT-PS). In between these times the receiver is powered down or asleep 204. Secondly, an awake time 206 is provided for the MSU transmitter to send a probe request to the AP, and for the receiver to receive a probe response. Probes may be sent out to actively verify the link of a currently serving AP, and if applicable sent to actively scan other neighboring APs. This awake time 206 is referred as the dwell-time settings for Active-Scan (DT-AS). Thirdly, an awake time 208 is provided to receive data from the AP, which whenever the MSU facilitates polling for buffered packets in the AP, or transmits out data traffic which would trigger the AP's packet offload, then the receiver needs to stay awake to hear the traffic that is sent back to the MSU. By the nature of the 802.11 protocol, this function is facilitated only with the currently serving AP link. This awake time 208 is referred as the listening-time to hear expected downlink data (LT-DD).

As explained previously, each beacon 200 includes a TBTT that informs the MSU processor of the timing of the next beacon. In the present invention, the MSU processor will determine if the next beacon arrives at the scheduled time and notes any changes of the beacon timing from the scheduled time. In practice, to reduce processing overhead, it is envisioned that the processor will only note the timing of every $N^{th}$ beacon, or preferably sample only a certain small number of consecutive beacons. In a good RF environment, the timing of the beacons will correspond well with the network configured beacon intervals. However, in a degraded RF environment, the beacon timing can change, and in particular can become delayed. The change in beacon timing can occur due to a congested RF environment, where there is contention for limited RF resources. In this case, the AP may need to delay the beacon to avoid collisions. Also, the change in beacon timing can occur due to the RF environment itself, where a beacon signal can experience interference, multipath conditions, or can even be dropped or uncaptured. These delays can be directly correlated to poor RF conditions, i.e. link quality. Preferably, a quantification of the link quality can be used as feedback for the MSU processor to reconfigure its beacon sampling mechanism to better monitor RF conditions. For example, under poor RF conditions, the number and/or frequency of beacon sampling can be increased, and under good RF conditions, the number and/or frequency of beacon sampling can be decreased.

It is envisioned that link quality (LQ) can be established in a learning phase consisting of one or more iterations of the beacon sampling demonstrated in FIG. 2. The frequency with which the LQ is determined is dynamically adjusted by a loopback of processing, in order to enhance the accuracy of the quantification of LQ. The learning phase includes defining the MSU's pre-existing LQ. For example, LQ can represent RF signal strength values. The learning phase also includes the establishment of a LQ reference and scale of LQ values. The LQ reference can be one value or array of numbers that trace to the pre-existing LQ. The LQ reference can represent the LQ value under expected "Ideal RF" (i.e. sterile) conditions, of which the Power Save (PS) mechanism of the MSU is designed for. The present invention can also determine the default configuration of the Power Save (PS) properties, dwell time for passive scan (DT-PS), dwell time for active scan (DT-AS), and listening time for triggered or polled downlink data (LT-DD). It should be noted that each of the three defaults mentioned above may have additional underlying characteristics, such as start and end times, minimum and maximum durations, proportional-sliding-window of before and after expected reception, and/or other characteristics.

Optionally, the present invention can normalize LQ values relative to the initialized LQ reference value to provide a percentage representing an amount of LQ change on the LQ scale. The scale need not be linear. For example, if the LQ is raw received signal strength, and the LQ scale is between a best (LQ reference) value of −50 dBm and worst LQ value of −90 dBm, then the LQ scale is defined as size 40 dBm, and LQ change may be then normalized as logarithms of the change before percentage is applied.

Once relative LQ is quantified, the present invention correlates the LQ percentage value with a set of re-configuration instructions to the three PS properties: DT-PS, DT-AS, LT-DD. This can be done in a uniform manner using a PS algorithm, or LQ value can be categorized into bins to provide step changes to the PS properties, or the LQ value can be associated with PS properties in a memory of the MSU. For example, a particular LQ value may call for a 50% increase in a DT-PS awake time. This 50% instruction can be provided to a PS engine in the MSU processor, which will direct the receiver to widen its DT-PS awake time by 50%. It should be noted that the awake window does not shift in time but only gets narrower/wider, although window shifting is an option. The amount of dwell time change per LQ change can be determined empirically to provide the best power efficiency.

Figure 3:
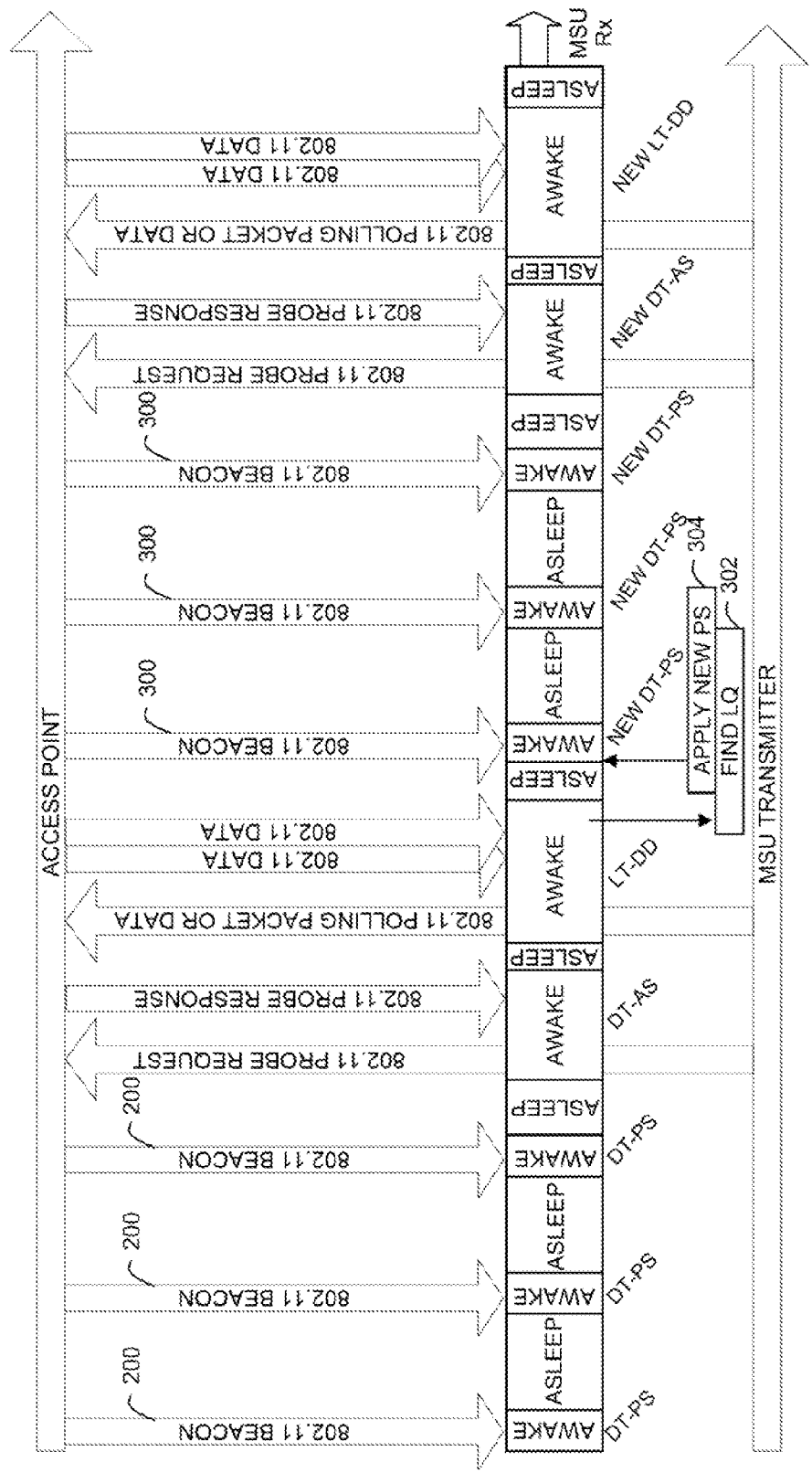
FIG. 3 is an expanded flow diagram of a communications in communication network, in accordance with the present invention.

Referring to FIG. 3, the present invention can sample beacons 200 using default dwell times of DT-PS (and using default dwell times for DT-AS and LT-DD for probes and data exchange). If there is a change in beacon timing then the processor of the MSU determines that there has been a change in link quality and a change in PS parameters is needed. The processor can use the LQ as in input 302 to determine the amount and type of PS change needed, which the processor can then apply 304 to the PS parameters to define a NEW DT-PS, NEW DT-AS, and NEW LT-DD. Although FIG. 3 shows steps 302 and 304 at particular times, it should be noted that these steps can occur at any point in the timeline. It should also be noted that it is not necessary that NEW DT-PS, NEW DT-AS, and NEW LT-DD be changed by the same amount, and it is preferred that each one be tailored individually.

The present invention dynamically re-configures MSU receiver PS properties as reaction to ongoing LQ evaluations correlated to beacon timing changes. The LQ evaluations may change due to physical, ergonomic (i.e. the way the MSU is held or antenna is attenuated), radio frequency environment, and/or other aspects, within periods in which no in-bound 802.11 protocol management information can be indicative of such changes. By autonomously reacting to ongoing link quality changes, the present invention allows for agile optimization of the receiver to the ever changing RF environment, and instructs the MSU to re-configure three specific power-save properties of the receiver in response to LQ changes. As those specific PS parameters are adjusted dynamically, the following aspects are addressed: a new optimization of the receiver's wake up times and battery power conservation is provided, the dynamic dwell-times for the passive and active scanning allows for better visibility of the network during bad RF situations, and the dynamic dwell-times for listening to data coming from the AP allows for less AP packet retries and drops during bad RF Situation.

Figure 4:
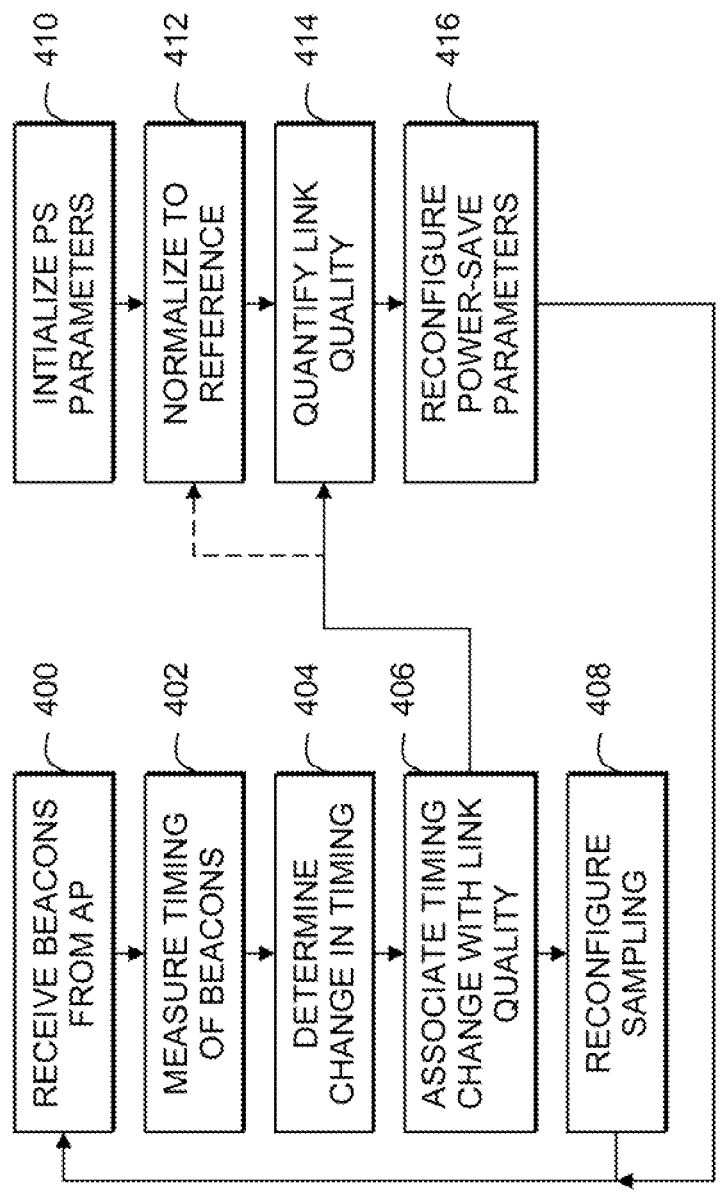
FIG. 4 is a simplified block diagram of a method, in accordance with one embodiment of the present invention.

FIG. 4 illustrates a flowchart of a method for a mobile subscriber unit in a wireless communication network.

One step of the method includes receiving 400 beacons from an access point. Preferably, this step includes sampling a portion of the beacons.

Another step of the method includes measuring 402 timing periods between received beacons.

Another step of the method includes determining 404 a change in timing periods. Specifically, determining includes determining a difference between an actual reception time of a beacon and a scheduled Target Beacon Transmission Time from a previous beacon.

Another step of the method includes associating 406 the change in timing periods to a change in a quality of a communication link.

A further step of the method includes reconfiguring 408 the sampling in response to the change in quality.

A further step of the method includes initializing 410 power-save parameters to default values.

An optional step of the method includes normalizing 412 link quality to a reference value.

A further step of the method includes quantifying 414 link quality.

A further step of the method includes reconfiguring 416 power-save parameters in response to a change in link quality, and specifically includes changing a dwell time of at least one awake period.

Advantageously, the present invention samples and relies on an AP's beacon timing information to determine RF link quality, and not on signal measurements or other receiver/transmitter statistics. The present invention avoids human/agronomical aspects that impact the performance of the MSU antenna. The present invention operates in a passive and dynamic manner, and it does not need to waste resources or time in the active exchange of RF information with the AP to determine link quality.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs for ICs with minimal experimentation.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for classifying Radio Frequency communication link quality by a mobile subscriber unit in a wireless local area communication network, the method comprising the steps of:

sampling a portion of beacons transmitted from an access point;

measuring a change in timing periods between received beacons by determining a difference between an actual reception time of a beacon and a scheduled reception time from a previous beacon as $TBTT_{current\ beacon}$=MODULUS(number=$TSF_{previous\ beacon}$, divisor=$BI_{previous\ beacon}$), where TBTT is Target Beacon Transmission Time, TSF is Time Synchronization Function field in the sampled beacon, and BI is the configured Beacon Interval;

determining a measurement accuracy classification of the communication link quality based on the change in timing periods $TBTT_{current\ beacon}$; and reconfiguring sampling based on the accuracy classification.

2. The method of claim 1, wherein reconfiguring includes accommodates bi-directional drifts involving both adding and subtracting positive and negative timing drifts in sampling a portion of the beacons.

3. The method of claim 1, wherein the accuracy classification in determining includes specific categories of accuracy classifications for $TBTT_{current\ beacon}$ values with respect to particular ranges of multiples of a standard ±0.01% range.

4. The method of claim 1, wherein determining includes determining that link quality changes in a random manner in specific regions of the network indicating over-the-air issues, whereupon reconfiguring in performed in a way responsive to the over-the-air issues.

5. The method of claim 4, wherein determining includes determining that link quality changes indicate that the access point is systematically underperforming with regards to IEEE 802.11 standard runtime operation irrespective of geographical area, whereupon reconfiguring in performed in a way responsive to the underperforming.

6. The method of claim 1, further comprising the step of normalizing link quality relative to an initialized link quality reference value to provide a percentage representing an amount of link quality change on a link quality scale.

7. The method of claim 1, further comprising the step of quantifying link quality.

8. The method of claim 7, further comprising the step of reconfiguring power-save parameters in response to a change in link quality.

9. The method of claim 8, wherein reconfiguring power-save parameters includes changing a dwell time of at least one awake period.

10. A mobile subscriber unit adapted for classifying Radio Frequency communication link quality in a wireless communication network, the mobile subscriber unit comprising:

a memory operable to be configured a classification of the communication link quality based on beacon timing period changes;

a transceiver operable to sample portions of beacons transmitted from an access point; and a processor coupled to the memory and transceiver, the processor operable to measure a change in timing periods between received beacons by determining a difference between an actual reception time of a beacon and a scheduled reception time from a previous beacon as $TBTT_{current\ beacon}$=MODULUS (number=$TSF_{previous\ beacon}$, divisor=$BI_{previous\ beacon}$), where TBTT is Target Beacon Transmission Time, TSF is Time Synchronization Function field in the sampled beacon, and BI is the configured Beacon Interval, determine a measurement accuracy classification of the communication link quality based on the change in timing periods $TBTT_{current\ beacon}$, and reconfiguring sampling based on the accuracy classification.

11. The mobile subscriber unit of claim 10, wherein the transceiver is operable to accommodate bi-directional drifts involving both adding and subtracting positive and negative timing drifts to sample a portion of the beacons.

12. The mobile subscriber unit of claim 10, wherein the accuracy classification determined by the processor includes specific categories of accuracy classifications for $TBTT_{current\ beacon}$ values with respect to particular ranges of multiples of a standard ±0.01% range.

13. The mobile subscriber unit of claim 10, wherein the processor is further operable to determine that link quality changes in a random manner in specific regions of the network, which indicates over-the-air issues, whereupon sampling is reconfigured in a way responsive to the over-the-air issues.

14. The mobile subscriber unit of claim 10, where the processor is further operable to quantify link quality.

15. The mobile subscriber unit of claim 14, wherein the processor is further operable to reconfigure power-save parameters in response to a change in link quality.

16. The mobile subscriber unit of claim 15, wherein reconfiguring power-save parameters includes changing a dwell time of at least one awake period.

* * * * *